US009561798B2

(12) United States Patent
Jerger et al.

(10) Patent No.: US 9,561,798 B2
(45) Date of Patent: Feb. 7, 2017

(54) CONTROLLING INTERNAL COMBUSTION ENGINE EMISSIONS

(71) Applicant: JAGUAR LAND ROVER LIMITED, Whitley, Coventry, Warwickshire (GB)

(72) Inventors: Rob Jerger, Coventry (GB); David Hayden, Coventry (GB); Simon Jarvis, Coventry (GB); Nick Wicks, Coventry (GB)

(73) Assignee: Jaguar Land Rover Limited, Whitley, Coventry (GB)

( * ) Notice: Subject to any disclaimer, the term of this patent is extended or adjusted under 35 U.S.C. 154(b) by 292 days.

(21) Appl. No.: 14/372,921

(22) PCT Filed: Jan. 17, 2013

(86) PCT No.: PCT/EP2013/050856
§ 371 (c)(1),
(2) Date: Jul. 17, 2014

(87) PCT Pub. No.: WO2013/107825
PCT Pub. Date: Jul. 25, 2013

(65) Prior Publication Data
US 2015/0032356 A1    Jan. 29, 2015

(30) Foreign Application Priority Data

Jan. 20, 2012  (GB) .................................. 1200936.1

(51) Int. Cl.
*B60W 30/00* (2006.01)
*B60W 30/18* (2012.01)
(Continued)

(52) U.S. Cl.
CPC ........ *B60W 30/18054* (2013.01); *B60W 10/06* (2013.01); *B60W 10/11* (2013.01);
(Continued)

(58) Field of Classification Search
CPC .................. B60W 2710/065; B60W 30/18054
See application file for complete search history.

(56) References Cited

U.S. PATENT DOCUMENTS

| | | | | |
|---|---|---|---|---|
| 4,784,020 A | * | 11/1988 | Hamano | ................. F16H 61/20 192/3.58 |
| 5,480,364 A | | 1/1996 | Hilbert et al. | |
| 6,276,131 B1 | | 8/2001 | Ueno et al. | |
| 7,141,000 B2 | * | 11/2006 | Mori | ..................... F02D 41/023 477/102 |
| 2002/0019291 A1 | * | 2/2002 | Ito | ......................... B60W 10/06 477/92 |
| 2003/0098010 A1 | | 5/2003 | Kustosch | |
| 2011/0040426 A1 | * | 2/2011 | Long | ..................... B60R 25/045 701/2 |

FOREIGN PATENT DOCUMENTS

DE   4325503 C1   8/1994
DE   19740699 A1  3/1999
(Continued)

OTHER PUBLICATIONS

Combined Search and Examination Report for GB Application No. GB1200936.1 dated May 16, 2012.
(Continued)

*Primary Examiner* — Tisha Lewis
(74) *Attorney, Agent, or Firm* — Carlson, Gaskey & Olds

(57) ABSTRACT

A method for heating a catalyst includes maintaining engine speed at a high rpm when the engine is started. The high rpm is maintained even if the driver shifts the transmission out of neutral. Engine speed is lowered when there is an indication that the driver wishes to drive off, such as the driver releasing the brake pedal. Maintaining the high rpm during the time between shifting the transmission out of neutral and providing an indication that drive off is desired contributes to additional catalyst warm up. The high rpm may be disabled if the catalyst temperature is sufficiently high or if the vehicle is parked on a slope, for example.

19 Claims, 3 Drawing Sheets

(51) Int. Cl.
*B60W 10/06* (2006.01)
*B60W 10/11* (2012.01)
*B60W 30/194* (2012.01)
*F02D 41/08* (2006.01)
*F02D 41/02* (2006.01)

(52) U.S. Cl.
CPC .......... *B60W 30/18* (2013.01); *B60W 30/194* (2013.01); *F02D 41/0255* (2013.01); *F02D 41/08* (2013.01); *B60W 30/18027* (2013.01); *B60W 2540/10* (2013.01); *B60W 2540/12* (2013.01); *B60W 2540/16* (2013.01); *B60W 2550/142* (2013.01); *B60W 2710/065* (2013.01); *F02D 41/0225* (2013.01); *F02D 2200/0802* (2013.01); *Y02T 10/26* (2013.01); *Y02T 10/54* (2013.01)

(56) References Cited

FOREIGN PATENT DOCUMENTS

| | | |
|---|---|---|
| EP | 1035304 A1 | 9/2000 |
| EP | 1367247 A1 | 12/2003 |
| EP | 1571314 A1 | 9/2005 |
| EP | 1574707 A1 | 9/2005 |
| JP | 2005248716 | 9/2005 |

OTHER PUBLICATIONS

International Search Report for International Application No. PCT/EP2013/050856 mailed May 14, 2013.

* cited by examiner

CONTROLLING INTERNAL COMBUSTION ENGINE EMISSIONS

This application is a U.S. National Phase Application of PCT/EP2013/050856, which was filed on Jan. 17, 2013, which claims priority to GB 1200936.1, which was filed on Jan. 20, 2012.

TECHNICAL FIELD

This invention relates to improvements in the control of emissions of internal combustion engines, in particular to achieve more rapid initiation of treatment of exhaust gases upon cold start of an engine. Aspects of the invention relate to a method and to a vehicle.

BACKGROUND

Vehicle emissions legislation prescribes certain limits for the emission of noxious gases in the exhaust stream of an internal combustion engine. Typically a catalytic converter is provided in the vehicle exhaust system, and operates to chemically convert noxious gases to relatively benign alternatives.

A catalytic converter requires a minimum temperature for effective operation, and this is achieved in a short period by heat transfer from the hot exhaust stream. When a vehicle starts in relatively cold conditions, the effective operation of the catalytic converter may be delayed. It would be desirable to reduce this delay so as to minimize emissions of untreated exhaust gas upon cold start.

SUMMARY

Aspects of the invention provide a method and a vehicle as claimed in the appended claims.

According to an illustrative embodiment there is provided a method of initiating treatment of the exhaust stream of an internal combustion engine of a vehicle having electronically sensed wheel brakes and an electronically sensed drive line, the method comprising the steps of:
  starting the vehicle engine;
  running the vehicle engine at a first idle speed;
  detecting movement of a drive line selector from a neutral to a drive condition while vehicle wheel brakes are activated;
  delaying enablement of said drive line until at least one indication that a driver desires that the vehicle starts moving is detected, so as to prolong duration of said first idle speed; and
  reducing engine speed from said first idle speed to a second, lower idle speed for drive line enablement subsequent to the delaying.

The method of the illustrative embodiment thus postpones enablement of the drive line until release of wheel brakes is detected. This is in contrast to conventional drive line enablement in which the drive line is enabled in response to movement of a drive line selector. The illustrative embodiment is intended for application to any vehicle drive line having non-manual enablement, and thus excludes a conventional manually selected and engaged transmission with a manual clutch. In such vehicles movement of the drive line selector and/or enablement of the drive line is generally inhibited unless the foot brake is applied. Furthermore starting of the vehicle engine may be inhibited unless the drive line selector is in neutral or park positions. Typically a drive line of a vehicle that includes idle speed control according to an embodiment of the invention will comprise automatically controlled enablement via an actuator, for example a hydraulic automatic transmission or an automated manual transmission.

In this specification 'drive line' means torque transmitting components linking the vehicle engine to the driven wheels of the vehicle.

Immediate enablement of the drive line upon selector movement may necessarily impose a drag on the vehicle engine which may in turn result in the engine speed dropping from high idle to normal idle. The reduction in engine speed may however be electronically commanded upon detection of selection of a drive condition, so as to ensure smooth drive line engagement. Normal idle speed is generally required in order to give acceptable launch characteristics to the vehicle, and to give a smooth, high quality experience to the vehicle occupants.

In some example embodiments, the postponement of enablement of the drive line permits a high idle speed to be maintained for a longer period, thus ensuring a greater quantity of hot exhaust gas streams through the catalytic converter before idle speed is reduced to normal, and with the consequence that the catalyst temperature is raised more quickly to the operating point.

The illustrative embodiments thus permit more rapid light-off of the catalyst in a manner which is not noticeable to the vehicle driver. It will be understood that enablement of the drive line can be very rapid in present kinds of electronically controlled vehicle transmission.

Typically the drive line will be enabled by engagement of a clutch to permit torque to be transmitted from the vehicle engine to the vehicle wheels. The clutch may be wet or dry, and form part of a multi-speed transmission commanded by a suitable electronic control unit (ECU). The enablement sequence of the drive line is selected to ensure smooth take-off can be achieved. In some circumstances for example a multi-speed transmission may temporarily engage a sequence of clutches before the launch clutch, so that the launch clutch can itself engage smoothly. This sequence should not be noticeable to the vehicle driver, and timing thereof should be accommodated by the control system so that idle speed is reduced at the appropriate time.

Drive line enablement may comprise two-stages, whereby for example an actuator is filled with working fluid in a first stage. In a second stage pressure in the filled actuator is increased to effect movement thereof. Illustrative embodiments accommodate such a first stage whilst high idle speed is maintained, since it is the second stage which enables torque transmission. This arrangement may reduce the time for drive line enablement in certain circumstances.

The vehicle wheel brakes typically comprise an electronically controlled ABS (anti-lock braking system) arrangement adapted to sense brake pressure, and to detect or predict wheel movement.

As will be well understood, most vehicle drivers do not drive-away immediately upon cold start of a vehicle engine, or upon selection of a drive condition (typically a low forward or a reverse speed ratio). Accordingly the benefit of the disclosed embodiments can be realised for most circumstances of use. In the event that immediate and rapid drive-away is required, the ECU will permit rapid drive line enablement; the period of high idle will be reduced—however in those circumstances the engine is generally producing a greater quantity of hot exhaust gas, which will itself reduce the delay before effective operation of the catalytic converter.

In a modification of the method of the illustrative embodiment, a temperature of the exhaust catalyst may be monitored, and the method may be disabled in the event that correct operation of the catalyst is determined. Thus the method can be confined to cold and cool starts only, and have the shortest appropriate duration of high idle.

In some embodiments, the method may take account of vehicle attitude. It will be appreciated that a vehicle may be parked on a slope, and in such circumstances may require a higher brake pressure to prevent movement than if on substantially level ground. The brake pressure to hold the vehicle against movement will increase as the slope increases.

In some embodiments the method may further comprise the steps of:
  detecting vehicle attitude;
  determining a corresponding minimum brake force to hold the vehicle against movement;
  detecting reducing brake force as the wheel brakes are released; and
  implementing a strategy to hold the vehicle wheels against movement at said minimum brake force pending drive line enablement.

These further steps prevent vehicle movement in the event that, due to gradient, there is a short period during which movement of the vehicle may be possible before the drive line is enabled. Whilst said movement may be very slight, it is preferable that it is eliminated.

The strategy to hold the vehicle wheels against movement may comprise for example implementing operation of a handbrake function, implementing a hill hold function of the wheel brakes, engaging an output component of a multi-speed transmission to ground (for example a transmission casing), locking a multi-speed transmission by simultaneous engagement of two speed ratios, or commanding drive line enablement; other solutions are possible, but in each case should be susceptible of electronic control under command of the relevant ECU.

In an embodiment, drive line enablement is blended with movement of the vehicle wheels (i.e. release of wheel brakes or disablement of the strategy to hold the vehicle wheels against movement) so that drive-off is smooth, and without perceptible roll-back.

Progressive take-up drive corresponding to automatic release of a conventional electronic handbrake or hill hold function provides one optional arrangement.

The method may include the step of detecting reducing brake force as the wheel brakes are released, and commanding drive line enablement at a predetermined brake force. The predetermined brake force may be selected by reference to vehicle attitude.

In this method, the drive line is enabled so that engine torque is transmitted to the vehicle wheels in order to counter any tendency for uncontrolled vehicle movement. The predetermined brake force may for example be found in a look-up table by reference to vehicle attitude, or calculated according to an appropriate algorithm.

The vehicle drive line may include a transmission susceptible of electronic control. Many kinds of transmissions are suitable, including conventional multi-speed hydraulic transmissions, and dual clutch transmissions.

Within the scope of this application it is expressly intended that the various aspects, embodiments, examples and alternatives set out in the preceding paragraphs, in the claims and/or in the following description and drawings, and in particular the individual features thereof, may be taken independently or in any combination. For example, features described in connection with one embodiment are applicable to all embodiments unless such features are incompatible.

BRIEF DESCRIPTION OF DRAWINGS

Embodiments of the invention will now be described, by way of example only, with reference to the accompanying drawings in which.

DETAILED DESCRIPTION

Figure 1:
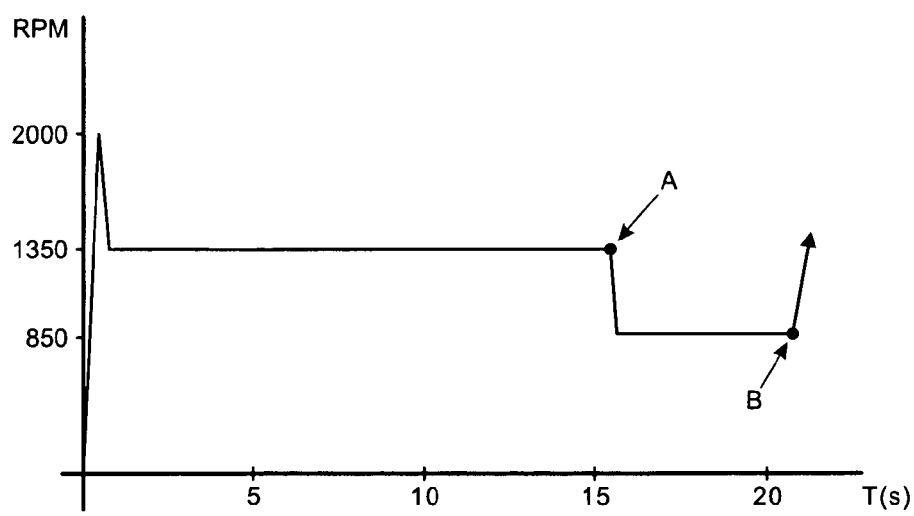
FIG. 1 is a graphical representation of engine speed during a conventional cold start sequence.

With reference to FIG. 1, a conventional cold engine start for an electronically controlled internal combustion engine typically has initial engine speed of 2000 rpm, which drops to a fast idle of 1350 rpm almost immediately. Fast idle is maintained until about 15 seconds from start, in order for example for combustion to stabilize. Idle speed then reduces at A to around 850 rpm as the drive line is selected and engaged, which is a suitable speed for the driver to move-off smoothly and progressively. Vehicle launch, that is to say drive-away, is at B, typically after a further period of about 5 seconds.

In any automatic or automated drive line, a controller will select an appropriate launch ratio in response to a driver command. Typically the driver will select a low ratio or DRIVE, from PARK or NEUTRAL. Commonly, starting of the vehicle engine is inhibited unless PARK is selected, and enabling of the drive line is inhibited unless the foot brake is applied.

Thus a typical cold start sequence comprises engine start with transmission in PARK, fast idle of the engine, foot brake on, selection of low speed ratio, and drive-away as the foot brake is released. The sequence may differ slightly according to the particular kind of transmission, which may for example be a conventional hydraulic automatic gearbox, an automated manual transmission or a twin clutch transmission.

The drive line controller is typically a transmission ECU in command of actuators within the transmission. These actuators can be electric, hydraulic or pneumatic, and effect engagement of one or more speed ratios and/or one or more torque transmitting friction elements.

In order to ensure smooth engagement of drive to the vehicle wheels, fast idle may be ceased upon selection of a drive condition. Such ceasing may be as a result of transmission drag, for example of a torque converter, or upon command of the ECU as selection of the drive condition is detected.

It will be appreciated that in this example it is assumed that the driver starts the engine, and that there is a brief delay before the drive line is enabled for drive-off—this delay may for example allow a seat belt to be engaged or for the driver to check an instrument display.

It will also be understood that engine idle speeds and times will vary according to engine type and specifications, and according to ambient conditions, and that the figures quoted above are merely illustrative.

Figure 2:
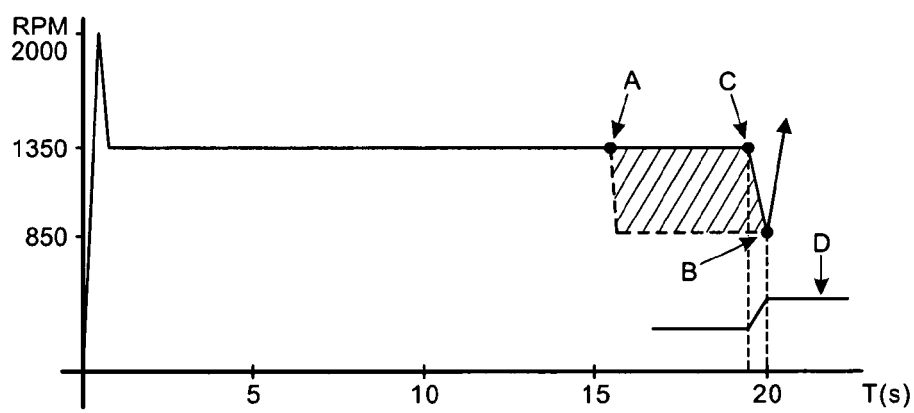
FIG. 2 corresponds to FIG. 1 and shows a cold start sequence according to an embodiment of the invention.

The effect of the invention is illustrated in FIG. 2. Drive is selected at point A, as in the prior art, but the drive line is not engaged. Accordingly there is no drag upon the engine and a high idle speed can be maintained until point C at which releasing of wheel brakes is sensed. Idle speed then reduces to point B as the drive line is engaged, ready for drive-away. This engagement is represented in FIG. 2 by trace D which illustrates a gradual rise in clutch pressure associated with drive engagement, and over the period during which idle speed is reducing from 1350 to 850 rpm. Trace D represents any suitable arrangement which progressively moves from a disengaged to an engaged condition.

The additional high speed idle contribution is represented by the shaded area of FIG. 2.

Figure 3:
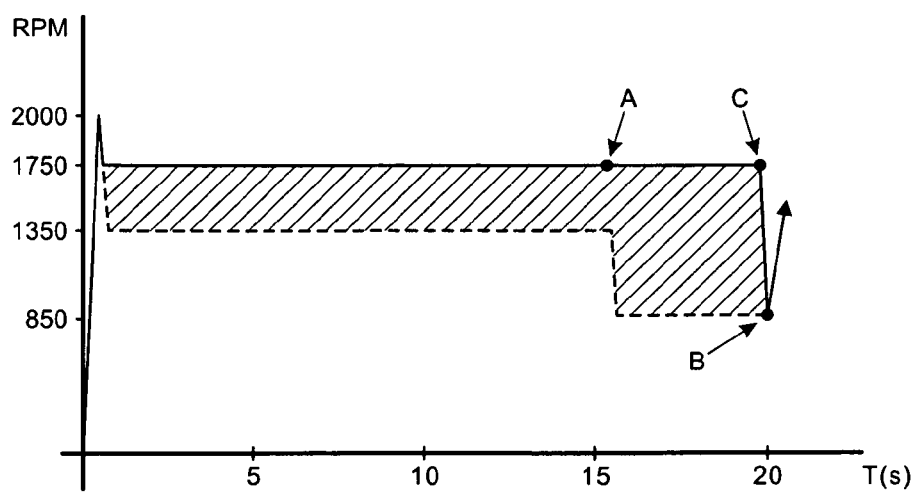
FIG. 3 illustrates a cold start sequence according to another embodiment of the invention.

In a further enhancement idle speed may be maintained at a higher level (e.g. 1750 rpm), as illustrated in FIG. 3, since the drive line is not engaged at the point of selection of drive. In consequence the engine need not be at a speed suitable for drive line selection (1350 rpm according to FIGS. 1 and 2) until releasing of wheel brakes is sensed. This embodiment blends the eventual reduction in idle speed with drive line engagement (in the manner of trace D of FIG. 2), so that for example such engagement commences as engine speed reduces from higher idle at 1750 rpm across the 1350 rpm threshold. The additional higher idle speed contribution is represented in the shaded area of FIG. 3.

In the event that the vehicle driver commands instant drive-away, the controller will typically terminate fast idle early so as to ensure rapid smooth enablement of the drive line. In such conditions the engine will quickly be commanded to generate significant power, in which case the exhaust gas will rapidly rise in temperature so as to achieve rapid light-off of the catalyst.

Fast (high) idle may also be terminated after a predetermined time period in the event that the driver does not command enablement of the drive line, or in response to light-off of the catalyst being detected or predicted. An exhaust gas temperature sensor at the inlet of the catalyst device may permit light-off to be assumed at a predetermined temperature threshold.

Figure 4:
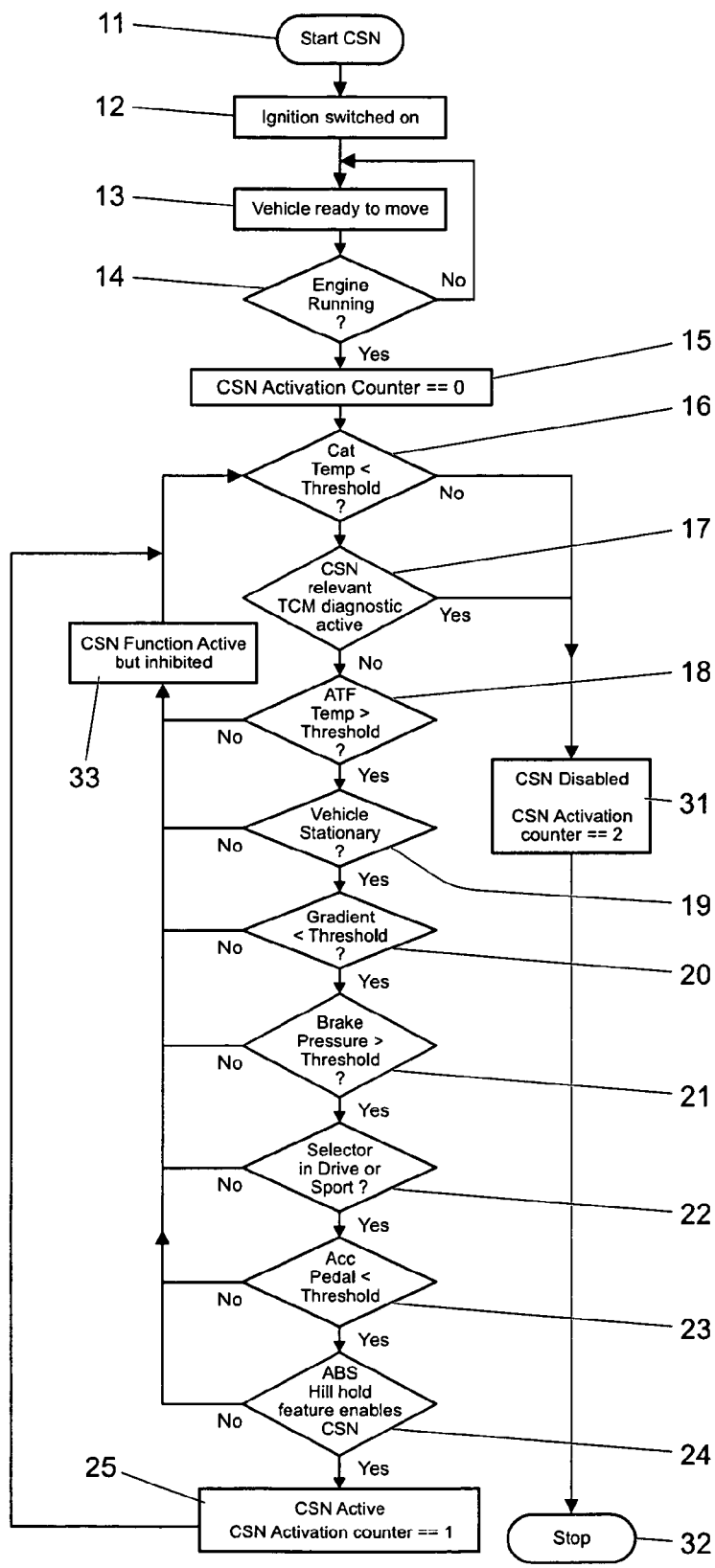
FIG. 4 is a flow chart of a typical engine start sequence in accordance with embodiments of the invention.

FIG. 4 illustrates a typical engine cold start with neutral maintained (CSN) to permit fast idle—i.e. drive line selected but not enabled—in accordance with the invention. An electronically controlled hydraulic multi-speed transmission is assumed.

At step 11 the validation routine of the invention is implemented and the vehicle ignition switched on (step 12). Other systems may be interrogated to ensure that the vehicle is ready to move (step 13), and confirmation is obtained that the engine is running (step 14).

CSN is assumed non-active (step 15) and the catalyst temperature is determined (step 16); if less than the threshold the routine continues, if not CSN is disabled (step 31). Step 16 prevents activation of CSN if the catalyst is at or above operating temperature. CSN is disabled until the next engine start event (step 32).

At step 17 a diagnostic check ensures relevant communications are working, for example control inputs from the braking system and transmission selector. A fault disables CSN.

At step 18 the temperature of automatic transmission fluid is checked. CSN may for example be inhibited (step 33) if ATF temperature is below a predetermined minimum of less than zero, say −6° C.

At step 19 a check is made that the vehicle is stationary, for example by signal from a motion sensor; if no CSN is inhibited.

At step 20 a check is made of vehicle attitude, for example to determine a minimum brake pressure which will hold the vehicle stationary. Above a threshold, CSN is inhibited. CSN may also be inhibited if the vehicle attitude exceeds a predetermined value, i.e. the vehicle is strongly inclined, say above 15°, or above 20° fore and aft.

At step 21 a check is made that brake pressure applied by the driver or a hill hold function is above a minimum to hold the vehicle; if no CSN is inhibited.

At step 22 a check is made for selection of a drive condition; if no CSN is inhibited.

At step 23 accelerator position is checked to determine if vehicle launch (drive-off) is imminent; if no CSN is inhibited. Launch may be indicated by movement of the accelerator from the rest condition. or beyond a pre-determined threshold.

At step 24 a hill hold feature of the anti-lock braking system is implemented to prevent roll back during CSN; if no CSN is inhibited.

At step 25 CSN is implemented, having passed validation, to permit fast idle to be maintained according to the invention.

The skilled man will of course select the necessary check functions in the routine of FIG. 4, and the steps quoted are merely examples appropriate to one selected embodiment.

Figure 5:
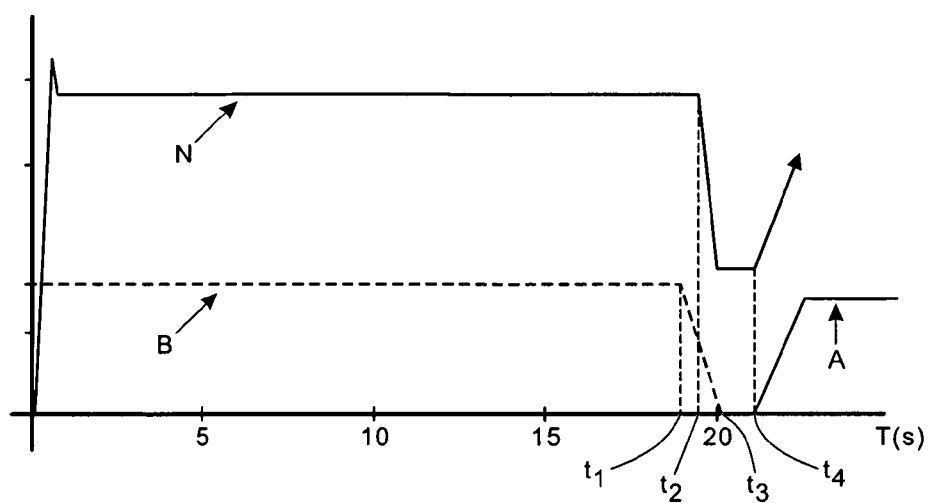
FIG. 5 illustrates graphically a cold start sequence according to embodiments of the invention.

In FIG. 5, a typical CSN routine is illustrated by way of example. At cold engine start, engine revolutions (N) are maintained at high idle whilst brake pressure (B) is applied, via driver brake application or hill hold functionality.

At time $t_1$ brake pressure begins to fall, and vehicle movement is accordingly predicted. At time $t_2$ engine speed begins to drop from fast to normal idle to permit smooth engagement of a pre-selected transmission ratio. At $t_3$ brake pressure reaches zero, but between $t_2$ and $t_3$ a transmission clutch is engaged to enable the drive line, and prevent vehicle roll-back.

At $t_4$ the accelerator (A) is depressed, and engine speed rises to permit drive-away.

Selection of times $t_1$-$t_4$ will be determined according to acceptable vehicle launch factors, the torque characterization of the transmission clutch, and other parameters relating to the vehicle brakes and accelerator—to the intent that prolongation of raised engine idle speed is substantially imperceptible to the vehicle driver.

It will also be understood that the engine speeds corresponding to normal, high and higher idle will be selected according to the technical specification of the engine and the required duty, and furthermore that the reduction of idle speed will blend with drive line engagement at a rate which gives acceptable take-up of drive with appropriate smoothness and quality. Selection of these factors is within the skill of a suitably qualified technician.

The invention claimed is:

1. A method of initiating treatment of the exhaust stream of an internal combustion engine of a vehicle having wheel brakes and a drive line, the method comprising:
    starting the vehicle engine;
    running the vehicle engine at a first idle speed;
    detecting movement of a drive line selector from a neutral to a drive condition while vehicle wheel brakes are activated;
    delaying enablement of said drive line until at least one indication that a driver desires that the vehicle start moving is detected, so as to prolong duration of said first idle speed; and
    reducing engine speed from the first idle speed to second, lower idle speed for drive line enablement.

2. A method according to claim 1, wherein the at least one indication comprises the wheel brakes being released and the method comprises monitoring brake pressure to determine releasing thereof.

3. A method according to claim 1, comprising:
   detecting vehicle attitude;
   determining a corresponding minimum brake force to hold the vehicle against movement;
   detecting reducing brake force as the wheel brakes are released; and
   implementing a strategy to hold the vehicle against movement at said minimum brake force pending drive line enablement.

4. A method according to claim 3, comprising implementing said strategy at a predetermined brake force above said minimum.

5. A method according to claim 4, comprising determining a brake pressure corresponding to said predetermined brake force and monitoring the vehicle brake pressure in real time.

6. A method according to claim 3, wherein said strategy comprises at least one of:
   engaging a vehicle handbrake,
   engaging a vehicle hill hold function,
   engaging an output component of said drive line to ground, and
   engaging simultaneous two speed ratios of a multi-speed transmission.

7. A method according to claim 1, comprising reducing engine speed from high idle to normal idle at a predetermined time after starting the vehicle engine.

8. A method according to claim 1, comprising reducing engine speed from high idle to normal idle above a predetermined exhaust gas temperature.

9. A method according to claim 1, comprising disabling said delaying step if the temperature of fluid in a drive line component is below a predetermined value.

10. A method according to claim 1, comprising monitoring accelerator position, and reducing engine speed from high idle to normal idle if movement of said accelerator away from the rest condition is detected.

11. A method according to claim 1, comprising monitoring movement of the vehicle, and disabling said delaying step if vehicle movement is detected.

12. A method according to claim 1, comprising monitoring vehicle attitude, and disabling said delaying step if the vehicle is inclined above a predetermined threshold inclination.

13. A vehicle having an electronically controlled drive line and electronically sensed wheel brakes, said vehicle being adapted for control according to the method of claim 1.

14. A vehicle according to claim 13, and including an electronic control unit having inputs of wheel brake pressure and drive line selector position, and being adapted to command engine idle speed and enablement of the vehicle drive line.

15. A vehicle according to claim 14, wherein said control unit is further provided with an input of vehicle attitude, is adapted to determine a minimum brake pressure to hold the vehicle at the instant attitude.

16. The method of claim 1, wherein the indication comprises the wheel brakes being released.

17. A vehicle, comprising:
   an internal combustion engine;
   wheel brakes;
   a drive line;
   a drive line selector; and
   a controller that is configured to
      run the engine at a first idle speed while the drive line selector corresponds to a neutral condition;
      detect movement of the drive line selector from the neutral to a drive condition while the wheel brakes are activated;
      delay enablement of said drive line after the detected movement while maintaining the first idle speed until determining that at least one criterion is satisfied; and
      enable the drive line and reduce engine speed from the first idle speed to a second, lower idle speed when the at least one criterion is satisfied.

18. The vehicle of claim 17, wherein the at least one criterion corresponds to an indication that a driver desires that the vehicle move.

19. The vehicle of claim 17, wherein the at least one criterion corresponds to at least one of
   the wheel brakes being released;
   an accelerator pedal being pressed;
   a predetermined time passing after starting the engine; or
   exhaust gas reaching a predetermined temperature.

* * * * *